United States Patent [19]

Hormadaly

[11] Patent Number: 4,548,742

[45] Date of Patent: Oct. 22, 1985

[54] RESISTOR COMPOSITIONS

[75] Inventor: Jacob Hormadaly, Wilmington, Del.

[73] Assignee: E. I. Du Pont de Nemours and Company, Wilmington, Del.

[21] Appl. No.: 562,964

[22] Filed: Dec. 19, 1983

[51] Int. Cl.$^4$ .............................................. H01B 1/06
[52] U.S. Cl. .................................. 252/519; 252/518; 29/620; 427/101; 427/102; 427/126.1; 427/126.2; 427/126.3; 427/376.2; 338/308; 338/309; 338/20; 428/436; 428/469; 428/472; 428/697; 428/702; 106/1.22; 106/1.27
[58] Field of Search ............... 252/518, 519; 427/101, 427/102, 126.1, 126.2, 126.3, 376.2, 375; 29/610 R, 620; 338/20, 308, 309; 423/593; 428/210, 432, 469, 472, 689, 697, 702; 106/1.22, 1.25, 1.27

[56] References Cited

U.S. PATENT DOCUMENTS

| | | |
|---|---|---|
| 4,129,525 | 12/1978 | Horowitz et al. .................. 252/518 |
| 4,163,706 | 8/1979 | Horowitz et al. .................. 252/518 |
| 4,176,094 | 11/1979 | Horowitz et al. .................. 252/518 |
| 4,476,039 | 10/1984 | Hormadaly ......................... 252/519 |

FOREIGN PATENT DOCUMENTS

| | | |
|---|---|---|
| 1063796 | 10/1979 | Canada . |
| 0095755 | 5/1983 | European Pat. Off. . |
| 2037270B | 5/1979 | United Kingdom . |

OTHER PUBLICATIONS

Binns, D. B., Transactions of the British Ceramic Society, 1–74, vol. 73.

*Primary Examiner*—Josephine L. Barr

[57] ABSTRACT

Thick film resistor composition which is a dispersion of (a) a conductive phase of a nonprecious metal pyrochlore and $SnO_2$, (b) inorganic binder and (c) $CoCrO_4$ and/or $NiCrO_4$ in (d) organic medium. The metal chromate functions as a TCR driver.

6 Claims, No Drawings

4,548,742

RESISTOR COMPOSITIONS

FIELD OF INVENTION

The invention relates to resistor compositions and especially to thick film resistor compositions.

BACKGROUND OF THE INVENTION

Thick film materials are mixtures of metal, metallic oxides, glass and/or ceramic powders dispersed in an organic medium. These materials, which are applied to nonconductive substrates to form conductive, resistive or insulating films, are used in a wide variety of electronic and light electrical components.

The properties of such thick film compositions depend on the specific constituents of the compositions. Most of such thick film compositions contain three major components. A conductive phase determines the electrical properties and influences the mechanical properties of the final film. A binder, usually a glass and/or crystalline oxide, holds the thick film together and bonds it to a substrate, and an organic medium (vehicle) acts as a dispersing agent and influences the application characteristics of the composition and particularly its rheology.

High stability and low process sensitivity are critical requirements for thick film resistors in microcircuit applications. In particular, it is necessary that resistivity ($R_{av}$) of a resistor be stable over a wide range of temperature conditions. Thus, the thermal coefficient of resistance (TCR) is a critical variable in any thick film resistor. Because thick film resistor compositions are comprised of a functional (conductive) phase and a permanent binder phase, the properties of the conductive and binder phases and their interactions with each other and with the substrate affect both resistivity and TCR.

In the formulation of thick film resistor compositions for particular applications, it is often found that the TCR for the anticipated temperature range in use is too high and it therefore becomes necessary to increase or reduce the TCR in order that the resistivity not change too much over the operating range of temperature. It is well known in the thick film resistor art that additions of small amounts of various inorganic compounds will accomplish this. For example, in ruthenium-based resistors, it is known to employ for this purpose CdO, $Nb_2O_5$, $TiO_2$, $MnO_2$, $Mn_2O_3$, $V_2O_5$ NiO, $Sb_2O_3$ and $Sb_2O_5$, all of which are negative TCR "drivers"; that is, they reduce TCR. On the other hand, CuO is known as a positive TCR driver in ruthenium-based resistors.

In the usual formulation of resistors, it is found that negative TCR drivers lower TCR, but simultaneously raise resistivity. Conversely, positive TCR drivers raise TCR, but lower resistivity. More recently, U.S. Pat. No. 4,362,656 to Hormadaly discloses the use of various manganese vanadates as TCR drivers for ruthenium-based resistors which have the advantage that they reduce TCR with only modest increases in resistance. It is interesting to note, however, that heretofore there is no known instance of a positive HTCR driver which also raises resistance. Moreover, it would be highly advantageous to have a TCR driver system with which both low positive and negative TCR's might be obtained in a resistor composition without raising resistance too much.

BRIEF DESCRIPTION OF THE INVENTION

The invention is therefore directed in its primary aspect to a resistor composition comprising an admixture of finely divided particles of (a) 40–85% wt. conductive phase containing 1–95% wt. nonprecious metal pyrochlore or precursive mixture thereof and 99–5% wt. $SnO_2$, (b) 60–15% wt. inorganic binder and (c) 0.05–10% wt. metal chromate selected from the group consisting of $CoCrO_4$ $NiCrO_4$ and mixtures thereof, dispersed in (d) organic medium.

In a secondary aspect, the invention is directed to resistor elements made by (a) forming a patterned thin layer of the above-described dispersion on a substrate, (b) drying the layer of step (a), and (c) firing the dried layer of step (b) in a nonoxidizing atmosphere to effect volatilization of the organic medium, decomposition of the metal chromate and liquid phase sintering of the inorganic binder and the conductive phase.

DETAILED DESCRIPTION OF THE INVENTION

A. Conductive Phase

The conductive phases which are useful in the composition of the invention are those described in U.S. patent application Ser. No. 460,572, filed Jan. 24, 1983. This application is incorporated herein by reference.

Basically, the conductive phase is an admixture of the above-referred nonprecious metal pyrochlore and $SnO_2$. The pyrochlore corresponds to the formula:

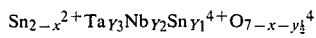

$$Sn_{2-x}{}^{2+}Ta_{Y3}Nb_{Y2}Sn_{Y1}{}^{4+}O_{7-x-y_{\frac{1}{2}}}{}^{4}$$

x=0–0.55
$Y_3$=0–2
$Y_2$=0–2
$Y_1$=0–0.5 and
$Y_1+Y_2+Y_3=2$

Analysis by x-ray indicates that the above-described compounds have pyrochlore-related structures. However, the precise nature of that pyrochlore-related structure has not been determined. Nevertheless, for purposes of convenience in referring to them, the terms "pyrochlore" and "pyrochlore-related compounds" are used interchangeably.

The above-described nonprecious metal pyrochlores can be made separately for addition to thick film resistor compositions or directly as a component of a conductive phase or a fully formed resistor material.

The pyrochlore-related compounds (pyrochlores) by themselves are prepared by firing an admixture of finely divided particles of SnO, $SnO_2$ and metal pentoxide at 500° to 1100° C. in a nonoxidizing atmosphere. A firing temperature of 700°–1000° C. is preferred.

A conductive phase suitable for the preparation of thick film resistors which contains the above-described pyrochlore can be made by two basic methods. In the first, 1–95% wt. of the powdered pyrochlore is mixed with 95–1% wt. of powdered $SnO_2$ and the admixture is fired to produce a conductive phase. From 2–50% wt. of pyrochlore is preferred.

In a second method for making the conductive phase, an admixture of finely divided SnO, $SnO_2$ and metal pentoxide is formed in which the mole ratio of SnO to metal pentoxide is 1.4–3.0 and the $SnO_2$ is the stoichiometric excess of SnO and metal pentoxide. The $SnO_2$ comprises 5–95% by wt. of the total oxides. This admixture is then fired at 600°–1100° C. by which the pyrochlore is formed as one solid phase and excess $SnO_2$ comprises the second phase of the fired reaction product. As in the case of making the pyrochlore by itself, the preferred firing temperature is 600°–1000° C.

B. Inorganic Binder

Glass frit is most frequently used as inorganic binder for resistors containing the above-described pyrochlores and can be virtually any lead-, cadmium- or bismuth-free glass composition having a melting point below 900° C. Preferred glass frits are the borosilicate frits such as barium, calcium or other alkaline earth borosilicate frits. The preparation of such glass frits is well known and consists, for example, in melting together the constituents of the glass in the form of the oxides of the constituents and pouring such molten composition into water to form the frit. The batch ingredients may, of course, be any compound that will yield the desired oxides under the usual conditions of frit production. For example, boric oxide will be obtained from boric acid; silicon dioxide will be produced from flint; barium oxide will be produced from barium carbonate; etc. The glass is preferably milled in a ball mill with water to reduce the particle size of the frit and to obtain a frit of substantially uniform size.

Particularly preferred glass frits for use in the resistor compositions of the invention are those Bi-, Cd- and Pb-free frits comprising by mole % 10–50% $SiO_2$, 20–60% $B_2O_3$, 10–35% BaO, 0–20% CaO, 0–15% MgO, 0–15% NiO, 0–15% $Al_2O_3$, 0–5% $SnO_2$, 0–7% $ZrO_2$ and 0–5% of a metal fluoride in which the metal is selected from the group consisting of alkali metals, alkaline earth metals and nickel, the mole ratio $$\frac{B_2O_3 + Al_2O_3}{SiO_2 + SnO_2 + ZnO_2} \text{ is } 0.8-4,$$

the total of BaO, CaO, MgO, NiO and $CaF_2$ is 5–50 mole % and the total of $Al_2O_3$, $B_2O_3$, $SiO_2$, $SnO_2$ and $ZrO_2$ is 50–85 mole % (preferably 60–85 mole %). Such glasses are particularly desirable because in combination with the above-described pyrochlores, they yield very highly positive hot TCR's at high resistance levels.

Other glasses which are especially suitable for use with pyrochlores of the type used in this invention include the cobalt-containing glasses of corresponding U.S. patent application Ser. No. 562,965 and the nickel-containing glasses of corresponding U.S. patent application Ser. No. 562,966, both of which have been filed concurrently herewith.

The glasses are prepared by conventional glassmaking techniques by mixing the desired components in the desired proportions and heating the mixture to form a melt. As is well known in the art, heating is conducted to a peak temperature and for a time such that the melt becomes entirely liquid and homogeneous. In the present work, the components are premixed by shaking in a polyethylene jar with plastic balls and then melted in a platinum crucible at the desired temperature. The melt is heated at a peak temperature of 1100°–1400° C. for a period of 1–1½ hours. The melt is then poured into cold water. The maximum temperature of the water during quenching is kept as low as possible by increasing the volume of water to melt ratio. After separation from water the crude frit is freed of residual water by drying in air or by displacing the water by rinsing with methanol. The crude frit is then ball milled for 3–15 hours in alumina containers using alumina balls. Alumina picked up by the materials, if any, is not within the observable limit as measured by x-ray diffraction analysis.

After discharging the milled frit slurry from the mill, excess solvent is removed by decantation and the frit powder is air dried at room temperature. The dried powder is then screened through a 325-mesh screen to remove any large particles.

The major two properties of the frit are that it aids the liquid phase sintering of the inorganic crystalline particulate materials and forms noncrystalline (amorphous) or crystalline materials by devitrification during the heating-cooling cycle (firing cycle) in the preparation of thick film resistors. This devitrification process can yield either a single crystalline phase having the same composition as the precursor noncrystalline (glassy) material or multiple crystalline phases with different compositions from that of the precursor glassy material.

A particularly preferred binder composition for the pyrochlore-containing resistors of the invention is comprised of 95–99.9% by weight of the above described bismuth-, cadmium- and lead-free glass and 5–0.1% wt. of a metal fluoride selected from the group consisting of $CaF_2$, $BaF_2$, $MgF_2$, $SrF_2NaF$, LiF, KF and $NiF_2$. The use of such metal fluorides with the frit produces a decrease in resistance of the resistors made therefrom.

C. Metal Chromate

The metal chromates suitable for the invention are $CoCrO_4$ and $NiCrO_4$ and mixtures thereof. These materials with suitable purity are quite soft and are readily reduced in size by the normal milling which is used to manufacture thick film compositions. Thus, the chromates can be added having whatever particle size is available and can be added directly to the paste formulation without prior milling.

The advantages of the metal chromate in the composition of the invention are threefold: (1) it permits precise blending of both positive and negative low-TCR pastes; (2) either the material itself or its decomposition products appear to catalyze decomposition of the organic medium; and (3) it is relatively inexpensive. With respect to the catalytic effect, it is possible that the chromate is decomposed during firing to either CoO or NiO and $Cr_2O_3$ with the concomitant release of oxygen from the particles. The metal oxide is believed to present catalytically active surfaces which aid oxidation of the organic medium, which is further aided by the release of oxygen from the decomposition of the chromate.

The amount of metal chromate(s) in the resistor composition will ordinarily be 0.01–5% wt. of the total solids excluding organic medium. At least 0.01% is needed to get a discernable effect, but more than 5% wt. must be avoided lest the HTCR of the compositions be too highly negative. Concentrations of 0.05–2.5% wt. are preferred. Compositions which utilize such metal chromates within these ranges have the further advantage that they are quite clear of staining, which is a further indication of their possible catalytic effect.

D. Organic Medium

The main purpose of the organic medium is to serve as a vehicle for dispersion of the finely divided solids of the composition in such form that it can readily be applied to a ceramic or other substrate. Thus, the organic medium must first of all be one in which the solids are dispersible with an adequate degree of stability. Secondly, the rheological properties of the organic medium must be such that they lend good application properties to the dispersion.

Most thick film compositions are applied to a substrate by means of screen printing. Therefore, they must have appropriate viscosity so that they can be passed through the screen readily. In addition, they should be thixotropic in order that they set up rapidly after being screened, thereby giving good resolution. While the rheological properties are of primary importance, the organic medium is preferably formulated also to give appropriate wettability of the solids and the substrate, good drying rate, dried film strength sufficient to withstand rough handling and good firing properties. Satisfactory appearance of the fired composition is also important.

In view of all these criteria, a wide variety of inert liquids can be used as organic medium. The organic medium for most thick film compositions is typically a solution of resin in a solvent and frequently a solvent solution containing both resin and thixotropic agent. The solvent usually boils within the range of 130°–350° C.

By far the most frequently used resin for this purpose is ethyl cellulose. However, resins such as ethylhydroxyethyl cellulose, wood rosin, mixtures of ethyl cellulose and phenolic resins, polymethacrylates of lower alcohols, and monobutyl ether of ethylene glycol monoacetate can also be used.

The most widely used solvents for thick film applications are terpenes such as alpha- or beta-terpineol or mixtures thereof with other solvents such as kerosene, dibutylphthalate, butyl carbitol, butyl carbitol acetate, hexylene glycol and high boiling alcohols and alcohol esters. Various combinations of these and other solvents are formulated to obtain the desired viscosity and volatility requirements for each application.

Among the thixotropic agents which are commonly used are hydrogenated castor oil and derivatives thereof and ethyl cellulose. It is, of course, not always necessary to incorporate a thixotropic agent since the solvent/resin properties coupled with the shear thinning inherent in any suspension may alone be suitable in this regard.

The ratio of organic medium to solids in the dispersions can vary considerably and depends upon the manner in which the dispersion is to be applied and the kind of organic medium used. Normally, to achieve good coverage, the dispersions will contain complementally by weight 60–90% solids and 40–10% organic medium. Such dispersions are usually of semifluid consistency and are referred to commonly as "pastes".

Pastes are conveniently prepared on a three-roll mill or muller. The viscosity of the pastes is typically within the following ranges when measured at room temperature on Brookfield viscometers at low, moderate and high shear rates:

| Shear Rate (Sec$^{-1}$) | Viscosity (Pa · s) | |
| --- | --- | --- |
| 0.2 | 100–5000 | — |
|  | 300–2000 | Preferred |
|  | 600–1500 | Most Preferred |
| 4 | 40–400 | — |
|  | 100–250 | Preferred |
|  | 140–200 | Most Preferred |
| 384 | 7–40 | — |
|  | 10–25 | Preferred |
|  | 12–18 | Most Preferred |

The amount and type of organic medium (vehicle) utilized is determined mainly by the final desired formulation viscosity and print thickness.

E. Formulation and Application

In the preparation of the composition of the present invention, the particulate inorganic solids are mixed with the organic medium and dispersed with suitable equipment such as a three-roll mill or muller to form a suspension, resulting in a composition for which the viscosity will be in the range of about 100–150 Pa.s at a shear rate of 4 sec$^{-1}$.

In the examples which follow, formulation was carried out in the following manner. The ingredients of the paste, minus about 5% wt. of the estimated organic components which will be required, are weighed together in a container. The components are then vigorously mixed to form a uniform blend; then the blend is passed through dispersing equipment such as a three-roll mill to achieve a good dispersion of particles. A Hegman gauge is used to determine the state of dispersion of the particles in the paste. This instrument consists of a channel in a block of steel that is 25 μm deep (1 mil) on one end and ramps up to 0" depth at the other end. A blade is used to draw down paste along the length of the channel. Scratches will appear in the channel where the agglomerates' diameter is greater than the channel depth. A satisfactory dispersion will give a fourth scratch point of 10–18 μm typically. The point at which half of the channel is uncovered with a well dispersed paste is between 3 and 8 μm typically. Fourth scratch measurement of 20 μm and "half-channel" measurements of 10 μm indicate a poorly dispersed suspension.

The remaining 5% of the organic components of the paste is then added and the resin content of the paste is adjusted to bring the viscosity when fully formulated to between 140 and 200 Pa.s at a shear rate of 4 sec$^{-1}$.

The composition is then applied to a substrate such as alumina ceramic, usually by the process of screen printing, to a wet thickness of about 30–80 microns, preferably 35–70 microns and most preferably 40–50 microns. The electrode compositions of this invention can be printed onto the substrates either by using an automatic printer or a hand printer in the conventional manner. Preferably automatic screen stencil techniques are employed using a 200- to 325-mesh screen. The printed pattern is then dried at below 200° C., e.g., about 150° C., for about 5–15 minutes before firing. Firing to effect sintering of both the inorganic binder and the finely divided particles of metal is preferably done in a well ventilated belt conveyor furnace with a temperature profile that will allow burnout of the organic matter at about 300°–600° C., a period of maximum temperature of about 800°–950° C. lasting about 5–15 minutes, followed by a controlled cooldown cycle to prevent over sintering, unwanted chemical reactions at intermediate temperatures, or substrate fracture which can occur from too rapid cooldown. The overall firing procedure will preferably extend over a period of about 1 hour, with 20–25 minutes to reach the firing temperature, about 10 minutes at the firing temperature and about 20–25 minutes in cooldown. In some instances, total cycle times as short as 30 minutes can be used.

F. Sample Preparation

Samples to be tested for temperature coefficient of resistance (TCR) are prepared as follows: A pattern of the resistor-formulation to be tested is screen printed upon each of ten coded Alsimag 614 1×1" ceramic substrates and allowed to equilibrate at room temperature and then dried at 150° C. The mean thickness of each set of ten dried films before firing must be 22-28 microns as measured by a Brush Surfanalyzer. The dried and printed substrate is then fired for about 60 minutes using a cycle of heating at 35° C. per minute to 900° C., dwell at 900-C for 9 to 10 minutes and cooled at a rate of about 30° C. per minute to ambient temperature.

G. Resistance Measurement and Calculations

Substrates prepared as described above are mounted on terminal posts within a controlled temperature chamber and electrically connected to a digital ohmmeter. The temperature in the chamber is adjusted to 25° C. and allowed to equilibrate, after which the resistance of each substrate is measured and recorded.

The temperature of the chamber is then raised to 125° C. and allowed to equilibrate, after which the resistance of the substrate is again measured and recorded.

The hot temperature coefficient of resistance (HTCR) is calculated as follows $$\text{Hot } TCR = \frac{R_{125°\,C.} - R_{25°\,C.}}{R_{25°\,C.}} \times (10,000) \text{ ppm/°C.}$$

The values of $R_{25°\,C.}$ and Hot TCR are averaged and $R_{25°\,C.}$ values are normalized to 25 microns dry printed thickness and resistivity is reported as ohms per square at 25 microns dry print thickness. Normalization of the multiple test values is calculated with the following relationship:

$$\text{Normalized Resistance} = \frac{\text{Avg. measured resistance} \times \text{Avg. dry print thickness, microns}}{25 \text{ microns}}$$

H. Coefficient of Variance

The coefficient of variance (CV) is a function of the average and individual resistances for the resistors tested and is represented by the relationship $\sigma/R_{av}$, wherein $$\sigma = \sqrt{\frac{\Sigma_i(R_i - R_{av})^2}{n-1}}$$

$R_i$ = Measured resistance of individual sample
$R_{av}$ = Calculated average resistance of all samples ($\Sigma_i R_i/n$)
n = Number of samples
CV = $\sigma/R_{av} \times 100$ (%)

EXAMPLES

Preparation of Glass Frit

In the examples which follow, the glass frit compositions listed in Table 1 below were made by the above described procedure. All were single phase glasses with no secondary phases present.

TABLE 1

| Glass No. | I | II | III |
|---|---|---|---|
| Composition | | (% wt.) | |
| BaO | 18.5 | 20.0 | 19.8 |
| CaO | 9.5 | — | — |
| MgO | — | 10.0 | 5.0 |
| NiO | — | — | 5.0 |
| $B_2O_3$ | 37.0 | 45.0 | 45.1 |
| $SiO_2$ | 32.5 | 23.0 | 23.1 |
| $SnO_2$ | 2.5 | — | — |
| $ZrO_2$ | — | 2.0 | 2.0 |

GLASS COMPOSITIONS (mole %)

PREPARATION OF CONDUCTIVE PHASE

A tantalum tin pyrochlore composition corresponding to the formula

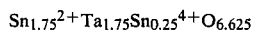

$$Sn_{1.75}^{2+}Ta_{1.75}Sn_{0.25}^{4+}O_{6.625}$$

was prepared by ball milling 71.42 g of SnO, 117.16 g of $Ta_2O_5$ and 11.42 g of $SnO_2$ using water as a dispersing medium. Upon completion of thorough mixing, the admixtures were dried and placed in alumina crucibles and heated in a furnace containing a nonoxidizing ($N_2$) atmosphere. The mixtures were then heated for 24 hours at 872° C.±10° C. to form the pyrochlore. The preparation and use of such pyrochlores is described in applicant's copending U.S. patent application Ser. No. 460,572, filed Jan. 24, 1983.

A 100-gram quantity of the above described pyrochlore was then combined with purified $SnO_2$ and ball milled for one hour using distilled water as a liquid milling medium. Upon completion of ball mill mixing, the mixtures of pyrochlore and $SnO_2$ were placed in a nitrogen furnace and fired for 24 hours at 870±10° C. The conductive phase material prepared in this manner was then used to formulate a thick film resistor paste having the composition given above.

EXAMPLES 1-11

Using the three glasses described in Table 1, a basic thick film resistor paste was formulated having the following composition:

| Conductive Phase | 49.00% wt. |
|---|---|
| Glass I | 17.37 |
| Glass II | 5.19 |
| Glass III | 2.20 |
| $CaF_2$ | 0.24 |
| Organic Medium | 26.00 |

The above-described paste was then divided into equal parts by weight and either $CoCrO_4$ or $NiCrO_4$ was admixed into all but one in the indicated amounts. In addition, further quantities of the compositions comprising blends of the paste of Examples 5 and 9 and of Examples 6 and 10, respectively, were tested to determine the effect of using mixtures of the two chromates. The compositions of the thick film resistor pastes and the electrical properties of the fired resistors prepared therefrom are given in Table 2, which follows:

TABLE 2

| | PROPERTIES OF CHROMOTE-CONTAINING THICK FILM RESISTOR COMPOSITIONS | | | | | | | | | | | |
|---|---|---|---|---|---|---|---|---|---|---|---|---|
| Example No. | 1 | 2 | 3 | 4 | 5 | 6 | 7 | 8 | 9 | 10 | 11[(1)] | 12[(2)] |
| Composition | | | | | (% wt.) | | | | | | | |

TABLE 2-continued
PROPERTIES OF CHROMOTE-CONTAINING THICK FILM RESISTOR COMPOSITIONS

| Example No. | 1 | 2 | 3 | 4 | 5 | 6 | 7 | 8 | 9 | 10 | 11[1] | 12[2] |
|---|---|---|---|---|---|---|---|---|---|---|---|---|
| Basic Paste | 100.00 | 99.90 | 99.75 | 99.50 | 99.00 | 98.00 | 96.00 | 99.50 | 99.00 | 98.00 | 99.00 | 98.00 |
| $CoCrO_4$ | — | 0.10 | 0.25 | 0.50 | 1.00 | 2.00 | 4.00 | — | — | — | 0.50 | 1.00 |
| $NiCrO_4$ | — | — | — | — | — | — | — | 0.50 | 1.00 | 2.00 | 0.50 | 1.00 |
| Resistor Properties | | | | | | | | | | | | |
| $R_{av}$ (kΩ/□/mil) | 102.54 | 134.15 | 145.48 | 216.61 | 328.50 | 426.88 | 535.81 | 146.38 | 176.78 | 279.70 | 294.29 | 350.60 |
| $CV_R$ (%) | 1.88 | 5.51 | 3.63 | 3.70 | 1.78 | 2.77 | 4.34 | 4.37 | 4.54 | 2.64 | 4.20 | 1.63 |
| $HTCR_{av}$ (ppm/°C.) | +72.4 | +66.2 | +69.1 | +61.7 | +103.1 | +128.3 | +155.8 | +55.7 | +20.6 | −143.6 | +50.9 | +9.5 |
| $\sigma_{HTCR}$ (ppm/°C.) | ±3.8 | ±6.5 | ±1.9 | ±4.7 | ±2.6 | ±4.3 | ±3.6 | ±6.2 | ±2.3 | ±10.6 | ±8.7 | ±4.6 |

[1] 50/50 admixture of Examples 5 and 9
[2] 50/50 admixture of Examples 6 and 10

The foregoing data show that, unlike other TCR drivers, both the $CoCrO_4$ and $NiCrO_4$ are effective over a wide range of concentrations to maintain low HTCR values for pyrochlore resistors. Nevertheless, at the same time, they raise the resistance of the compositions only slightly. Example 10 shows that higher concentration of $NiCrO_4$ can be used to obtain negative HTCR values. In addition, Examples 11 and 12 show that mixtures of $CoCrO_4$ and $NiCrO_4$ are similarly effective and give HTCR values intermediates to those obtained by the materials when each is used as the sole TCR driver.

I claim:

1. A thick film resistor composition comprising an admixture of finely divided particles of (a) 40–85% wt. of a conductive phase consisting essentially of 1–95% wt. of a pyrochlore corresponding to the formula:

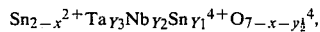

$$Sn_{2-x}^{2+}Ta_{Y_3}Nb_{Y_2}Sn_{Y_1}^{4+}O_{7-x-y_{\frac{1}{2}}}^{4-},$$

wherein $x = 0–0.55$
$Y_3 = 0–2$
$Y_2 = 0–2$
$Y_1 = 0–0.5$ and
$Y_1 + Y_2 + Y_3 = 2$ or precursive mixtures thereof and 99–1% wt. $SnO_2$; (b) 60–15% wt. inorganic binder, and (c) 0.05–10% wt. $CoCrO_4$, $NiCrO_4$ or mixtures thereof, dispersed in (d) an organic medium.

2. The composition of claim 1 in which (a) is 60–80% wt., (b) is 40–20% wt. and (c) is 0.05–2.5% wt.

3. The composition of claim 1 in which the conductive phase contains 2–50% wt. pyrochlore and 90–50% wt. $SnO_2$.

4. The composition of claim 1 in which $Y_2 = 0$.

5. The composition of claim 1 in which the chromate comprises 0.05–2.5% wt. of the solids.

6. A resistor element made by (a) forming on a substrate a patterned thin layer of the composition of claim 1; (b) drying the layer of step (a); and (c) firing the dried layer of step (b) in a nonoxidizing atmosphere to effect volatilization of the organic medium, decomposition of the metal chromate and sintering of the inorganic binder and the conductive phase.

* * * * *